(12) United States Patent
Frank et al.

(10) Patent No.: US 7,397,678 B2
(45) Date of Patent: Jul. 8, 2008

(54) METHOD FOR DRIVING A SWITCH THAT CONTROLS CURRENT DRAWN IN A POWER FACTOR CORRECTION CIRCUIT AND A DRIVE CIRCUIT THEREFOR

(75) Inventors: Wolfgang Frank, Augsburg (DE); Michael Herfurth, Gilching (DE); Sven Kolberg, Sassnitz (DE)

(73) Assignee: Infineon Technologies AG, Munich (DE)

( * ) Notice: Subject to any disclaimer, the term of this patent is extended or adjusted under 35 U.S.C. 154(b) by 61 days.

(21) Appl. No.: 11/177,928

(22) Filed: Jul. 8, 2005

(65) Prior Publication Data

US 2006/0013026 A1    Jan. 19, 2006

(30) Foreign Application Priority Data

Jul. 9, 2004    (DE)    ............ 10 2004 033 354

(51) Int. Cl.
*G05F 1/70*    (2006.01)
*H02M 7/217*    (2006.01)

(52) U.S. Cl. .................... 363/89; 323/207; 323/222; 323/283; 323/285; 323/299

(58) Field of Classification Search ............ 323/207, 323/211, 222, 283, 285, 299; 363/89
See application file for complete search history.

(56) References Cited

U.S. PATENT DOCUMENTS

| | | | | |
|---|---|---|---|---|
| 5,359,274 | A * | 10/1994 | Bandel | 323/207 |
| 5,644,214 | A * | 7/1997 | Lee | 323/211 |
| 5,757,635 | A * | 5/1998 | Seong | 363/89 |
| 5,818,707 | A * | 10/1998 | Seong et al. | 363/89 |
| 6,373,735 | B2 * | 4/2002 | Usui | 363/89 |
| 6,842,353 | B2 * | 1/2005 | Yamada et al. | 363/89 |

(Continued)

FOREIGN PATENT DOCUMENTS

DE    100 40 411 A1    3/2002

(Continued)

OTHER PUBLICATIONS

"Boost Controller TDA 4683, Power Factor Controller IC for High Power and Low THD", Data Sheet, V 1.0, Infineon Technologies AG, May 2003, pp. 1-26, (26 pages).

(Continued)

*Primary Examiner*—Jeffrey L Sterrett
(74) *Attorney, Agent, or Firm*—Maginot, Moore & Beck (57) ABSTRACT

The invention relates to a method for provision of a drive signal for a switch which controls the current drawn by an inductive energy storage element in a power factor correction circuit, in which a control signal which controls the power consumption is available. One drive cycle of the switch comprises:

detection of a predetermined storage state of the inductive energy storage element;
  when the predetermined storage state of the storage element is detected, production of a switching-on level for the drive signal for a regular switched-on duration which is dependent on the control signal or for a maximum switched-on duration which is dependent on an input voltage, when the regular switched-on duration is greater than the maximum switched-on duration; and
  production of a switching-off level for the drive signal for a switched-off duration until the next detection of the predetermined storage state.

19 Claims, 6 Drawing Sheets

U.S. PATENT DOCUMENTS

| | | | |
|---|---|---|---|
| 6,882,551 B2 * | 4/2005 | Shimada et al. | 363/79 |
| 6,946,819 B2 * | 9/2005 | Fagnani et al. | 323/207 |
| 7,031,173 B2 * | 4/2006 | Feldtkeller | 363/89 |
| 7,042,743 B2 * | 5/2006 | Pidutti et al. | 363/89 |

FOREIGN PATENT DOCUMENTS

| | | | |
|---|---|---|---|
| EP | 0 991 169 A2 | 4/2000 | |

OTHER PUBLICATIONS

"TDA-Technical Description AN-PFC-TDA 4863-1", Application Note, V 1.2, Infineon Technologies AG, Oct. 2003, pp. 1-16, (16 pages).

* cited by examiner

METHOD FOR DRIVING A SWITCH THAT CONTROLS CURRENT DRAWN IN A POWER FACTOR CORRECTION CIRCUIT AND A DRIVE CIRCUIT THEREFOR

BACKGROUND

The present invention relates to a method for driving a switch, which controls the current drawn by an inductive energy storage element, in a switched-mode converter which is in the form of a step-up converter, in particular in a switched-mode converter which is used as a power factor correction circuit (Power Factor Controller, PFC), and to a drive circuit for a switch such as this in a switched-mode converter.

A switched-mode converter that is used in a PFC circuit is described, by way of example, in DE 100 40 411 A1. A drive circuit for a switch to control the power consumption in a PFC circuit is the integrated module of the TDA4863 type from Infineon Technologies AG, Munich, which is described in "Boost Controller TDA 4683, Power Factor Controller IC for High Power and Low THD", Data Sheet, V 1.0, Infineon Technologies AG, May 2003. The use of the integrated module in a power factor correction circuit is described in "TDA—Technical Description AN-PFC-TDA 4863-1", Application Note, V1.2, Infineon Technologies AG, October 2003.

The basic design of a switched-mode converter such as this will be explained in the following text, with reference to FIG. 1, in order to assist understanding of the problem on which the invention is based.

The object of a switched-mode converter that is used as a PFC is to provide a DC voltage Vn for a load from an AC voltage Vn, in particular a power supply AC voltage, in which case the mean current drawn by the PFC should be at least approximately proportional to the profile of the input voltage Un in order to receive mainly real power.

Figure 1:
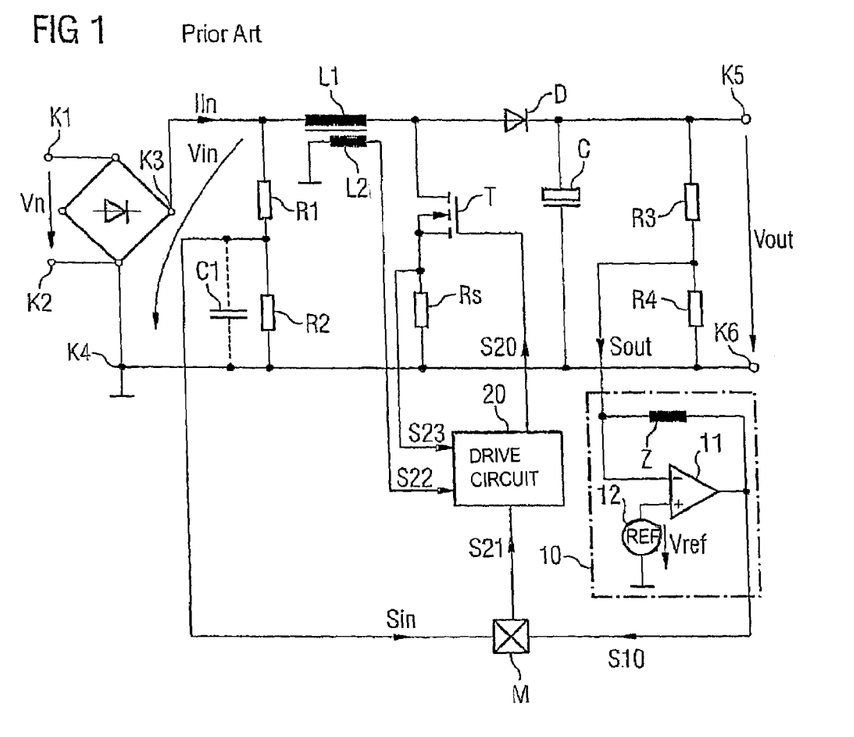
FIG. 1 shows a power factor correction circuit according to the prior art.

The switched-mode converter that is illustrated in FIG. 1 has connecting terminals K1, K2 for application of an input voltage Vn, for example a sinusoidal power supply voltage, and a rectified GL which is connected downstream from the input terminals and produces a rectified voltage Vin from the input voltage Vn and the terminals K3, K4. These terminals K3, K4 are also referred to in the following text as input terminals of the switched mode converter. A converter stage with a step-up converter topography is arranged between these input terminals K3, K4 and output terminals KS, K6. In parallel with the input terminals K3, K4, this converter stage has a series circuit comprising an inductive energy storage element L1, for example a storage conductor, and a switch T which, for example, is in the form of a power transistor. A second rectify arrangement, which in the example comprises a diode D and a capacitor C, is connected in parallel with the switch T, and, when the switch T is open, in series with the inductive energy storage element L1. The capacitor C is connected between the output terminals KS, K6, at which an output voltage Vout is available.

In this switched-mode converter, which is in the form of a step-up converter, the inductive energy storage element Ll receives energy when the switch T is closed, and emits this energy to the output capacitor C and to the output terminals KS, K6 when the switch is subsequently opened.

A control signal, which is dependent on the output voltage Vout and is provided by a regulator 10, is available in the switched-mode converter. The regulator 10 forms the difference between this output signal Sout (which is produced by a voltage divider R3, R4 from the output voltage Vout) and a reference value Vref, and produces the control signal S10 as a function of this difference. In the simplest case, the regulator comprises an operational amplifier 11, which is also referred to as an error amplifier and is connected externally to an impedance Z in order to adjust the control response.

In order to produce a drive signal S20 for the switch T, the control signal S10 is multiplied by an input signal Sin, which is dependent on the rectified input voltage Vin and is produced by means of a voltage divider R1, R2, C1 from the input voltage Vin, in order to produce a comparison signal S21 which is supplied to a drive signal production circuit 20.

This signal production circuit 20 produces a pulse-width-modulated drive signal S20 in order to drive the switch T and is designed to always produce a switching-on level for the drive signal S20, in order to switch on the switch T, as soon as the storage inductor is free of energy after the switch has been switched off, that is to say when the drive signal S20 is at a switching-off level. An auxiliary winding is used to determine the storage states in which the storage inductor is free of energy, and is inductively coupled to the inductor L1 and supplies a magnetization signal S22 to the signal production circuit 20, with this magnetization signal S22 indicating the magnetization state of the storage inductor L1.

In order to adjust the switched-on duration, the signal production circuit 20 compares the comparison signal S21 (which depends on the input voltage Vin and the control signal S10) with a current measurement signal S23 which is dependent on the current through the switch T. The current through the switch T, and thus the current measurement signal S23 rise, when the switch T is closed, in proportion to the input voltage Vin. A switching-off level for the drive signal S20 is produced by the signal production circuit 20 once the current measurement signal S23 has risen to the value of the comparison signal.

Figure 2:
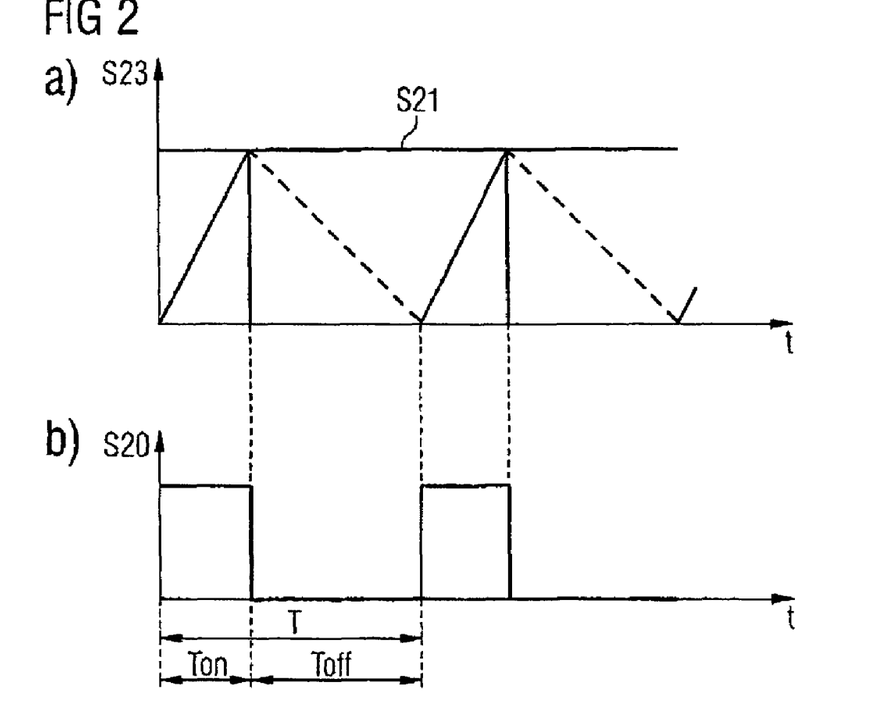
FIG. 2 shows waveforms of the input current and of the current through the switch in a power factor correction circuit (FIG. 2a) and of a drive signal for the switch (FIG. 2b).

FIG. 2a illustrates the waveform of the current measurement signal S23 for two successive drive cycles.

The profile of the input current Iin is also shown, by dashed lines, with this input current Iin corresponding to the current through the switch T during the period in which the drive signal S20 is switched on and falling to zero during the period in which it is switched off, which is equivalent to demagnetization of the inductor L1. For the illustration in FIG. 3, the value of the measurement signal S23 corresponds to the input Iin, whose peak value is limited by the comparison signal S21.

FIG. 2b shows the profile of the drive signal S20, which is formed as a function of the magnetization state of the inductor and as a function of a comparison between the current measurement signal S23 and a comparison signal. Ton in this case denotes the switched-on duration, during which the drive signal S20 assumes a switching-on level for the switch T, and Toff denotes a switched-off duration, during which the drive signal S20 assumes a switching-off level.

Figure 3:
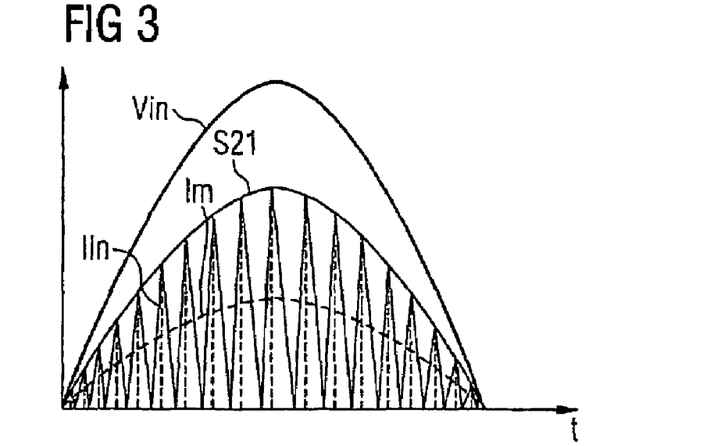
FIG. 3 shows waveforms of the input voltage, of the input current and of the mean input current for a power factor correction circuit.

FIG. 3 shows the waveform of the input voltage Vin for one period of a rectified input voltage Vin in the form of the magnitude of a sine wave, the profile which results from this of the comparison signal S21 in the presence of a control signal S10 that is assumed to be constant for this period, and the profile of the input current. The relationship between the comparison signal S21 and the input voltage Vin results in the comparison signal S21 likewise rising when the input voltage Vin rises. Since the current through the switch T likewise rises as the input voltage Vin rises, constant switched-on durations Ton ideally result when the control signal S10 remains the same, that is to say when the load conditions at the output remain the same, while the switched-off durations Toff vary. The mean value of the input current Iin is in this case proportional to the input voltage.

It can be shown that, for the instantaneous value of the power consumption of a power factor correction circuit such as this:

$$P=0.5 \cdot Vin^2 \cdot Ton/L1 \quad (1a)$$

Furthermore, the power consumption can also be indicated using the relative switched-on duration d=Ton/T:

$$P=0.5 \cdot Vin^2 \cdot d \cdot T/L1 = 0.5 \cdot Vin^2 \cdot d/(L1 \cdot f) \quad (1b).$$

In this case, P denotes the instantaneous value of the power consumption, Vin the input voltage, Ton the switched-on duration, L1 the inductance value of the inductor, and f=1/T the switching frequency. The above relationships for the instantaneous value of the power consumption P are also valid when the overall period duration T is not constant.

From (1a), the switched-on duration Ton is obtained as a function of the input current Iin as follows:

$$Ton = \hat{I}in \cdot L/Vin \quad (2a),$$

in a corresponding manner, the relative switched-on duration d is:

$$d = \hat{I}in \cdot L/(Vin \cdot T) \quad (2b)$$

where $\hat{I}in$ denotes the peak value of the input current Iin reached in each drive cycle. This peak value is proportional to the comparison signal S21, so that:

$$Ton = k \cdot S21 \cdot L/Vin \quad (3)$$

where k denotes a proportionality factor. Substitution of (3) in (1) gives:

$$P = 0.5 \cdot k \cdot S21 \cdot Vin \quad (4)$$

As is evident from (1), the switched-on duration Ton for a given power consumption is inversely proportional to the square of the input voltage Vin. For so-called wide-range power supply units which have to be designed to produce a constant output voltage Vout for input voltages Vin with peak values between 90V and 270V, this means that the switched-on duration for an input voltage of 90V (=⅓·270V) must be 9 times the switched-on duration for a voltage of 270V. The comparison signal S21 for a given power consumption is inversely proportional to the input voltage Vin. During one period of the input voltage, the power consumption is in each case a maximum when the input voltage Vin reaches its maximum value. The comparison signal S21 is also maximized at this time. If one considers the range over which peak values of the input voltage Vin can fluctuate, then the comparison signal assumes its maximum value at the peak value of the smallest possible input voltage.

In the case of a wide-range power supply unit, it is assumed that the rated power consumption is reached when the input voltage Vin assumes a peak value 90V and the comparison signal S21 assumes a maximum value S21max. If the input voltage changes such that peak values of 270V occur, then the maximum value of the comparison signal S21 is reduced to S21max/3. This comparison signal S21 is matched to different input voltage conditions by means of the control signal S10.

If an overload now occurs at the output of the converter when the input voltage is high, resulting in the output voltage Vout falling, then the comparison signal S21 can be regulated up to its maximum value S21max by means of the regulator 10, thus resulting in a power consumption which corresponds to 9 times the rated power. This can lead to instabilities in the power consumption control process.

One aim of the present invention is to provide a method for driving a switch which controls the power consumption in a power factor correction circuit, which method ensures stable control of the power consumption, and to provide a drive circuit for driving a switch in a power factor correction circuit.

SUMMARY

A method is disclosed for provision of a drive signal for a switch which controls the current draw by an inductive energy storage element in a power factor correction circuit, which has a rectifier arrangement which is coupled to the inductive energy storage element and has output terminals for provision of an output voltage and in which a control signal which controls the power consumption is available, with the method having the following method steps:

detection of a predetermined storage state of the inductive energy storage element,     when the predetermined storage state of the storage element is detected: production of a switching-on level for the drive signal for a regular switched-on duration which is dependent on the control signal or for a maximum switched-on duration which is dependent on the input voltage, when the regular switched-on duration is greater than the maximum switched-on duration, in order in this way to limit the power consumption,     production of a switching-off level for the drive signal for a switched-off duration until the next detection of the predetermined storage state.

Instabilities in the control of the power consumption are avoided in the case of the method in that a maximum switched-on duration is defined as a function of the input voltage, in order to define a maximum power consumption which is not exceeded.

In addition to the definition of a maximum switched-on duration for power emitting, it is also possible to limit the power consumption by defining a maximum current draw. The method for producing the drive signal in this context provides the following method steps:

detection of a predetermined storage state of the inductive energy storage element,     provision of a current measurement signal which is dependent on an input current,     when the predetermined storage state of the storage element is detected: Production of a switching-on level for the drive signal for a regular switched-on duration which is dependent on the control signal, or until a peak value of the switch current which is dependent on the input voltage is reached, if this peak value is reached within the regular switched-on duration,     production of a switching-off level for the drive signal for a switched-off duration until the next detection of the predetermined storage state.

The predetermined storage state of the inductive energy storage element is preferably that state in which a first complete demagnetization of the storage element occurs after the switched-on duration has elapsed.

One exemplary embodiment provides for the input voltage to be determined from the switched-on duration, the switched-off duration and the output voltage or a signal which is dependent on the output voltage. This makes use of the fact that, in a power factor correction circuit in which the switch is always switched on again on reaching demagnetization of the storage element, the input voltage Vin during one drive period of the switch is related in accordance with the following equation to the switched-on duration, the switched-off duration and the inductance value of the storage element:

$$Vin = Toff \cdot Vout/(Ton+Toff) \quad (5a)$$

where Vin denotes the input voltage, Ton the switched-on duration, Toff the switched-off duration and Vout the output voltage.

In a corresponding manner, the input voltage Vin can also be determined from the relative switched-on duration d=Ton/T=Ton/(Ton+Toff), in which case:

$$Vin = Vout \cdot (1-d) \quad (5b)$$

With reference to equation (1a), the switched-on duration Ton of a switch in a power factor correction circuit for a given power consumption P as a function of the input voltage Vin and the inductance value L1 of the inductive energy storage element is:

$$Ton = 2 \cdot P \cdot L1/Vin^2 \quad (6a)$$

and the relative switched-on duration is:

$$d = 2 \cdot P \cdot L1/(Vin^2 \cdot T) \quad (6b)$$

The maximum switched-on duration Vin in the case of the method according to the invention is preferably determined on the basis of the following relationship:

$$Tonmax = 2 \cdot Pmax \cdot L1/Vin^2 = klim1/Vin^2 \quad (7a)$$

where Tonmax represents the maximum switched-on duration, Vin the input voltage and klim1 a predetermined limit value which takes account of the maximum permissible power consumption Pmax. The limit value klim1 also takes account of the inductance value of the inductive energy storage element.

In a corresponding manner, the maximum relative switched-on duration donmax can be defined as follows:

$$donmax = 2 \cdot Pmax \cdot L1/(Vin^2 \cdot T) = klim1/Vin^2 \cdot T) \quad (7b)$$

The switched-on duration is preferably determined using a current measurement signal that is dependent on the input current, a first comparison signal that is dependent on the control signal and a second comparison signal that is dependent on the input voltage, with a switching-off level for the drive signal being produced when the current measurement signal reaches the lower of the two comparison signals. The second comparison signal is in this case chosen such that the current measurement signal reaches this comparison signal after the maximum switched-on duration.

The peak current value on reaching which the switch is in each case switched off in the second alternative of the method, when this peak current value is reached within the regular switched-on duration, is preferably determined on the basis of the following relationship:

$$Imax = klim2/Vin \quad (8)$$

where Imax represents the peak current, Vin the input voltage and klim2 a predetermined limit value which takes account of the maximum power consumption and the inductance value of the inductive energy storage element.

BRIEF DESCRIPTION OF THE DRAWINGS

The invention will be explained in more detail in the following text using exemplary embodiments and with reference to figures, in which.

Unless stated to the contrary, identical reference symbols in the figures denote identical parts, with the same meaning.

DESCRIPTION

Figure 4:
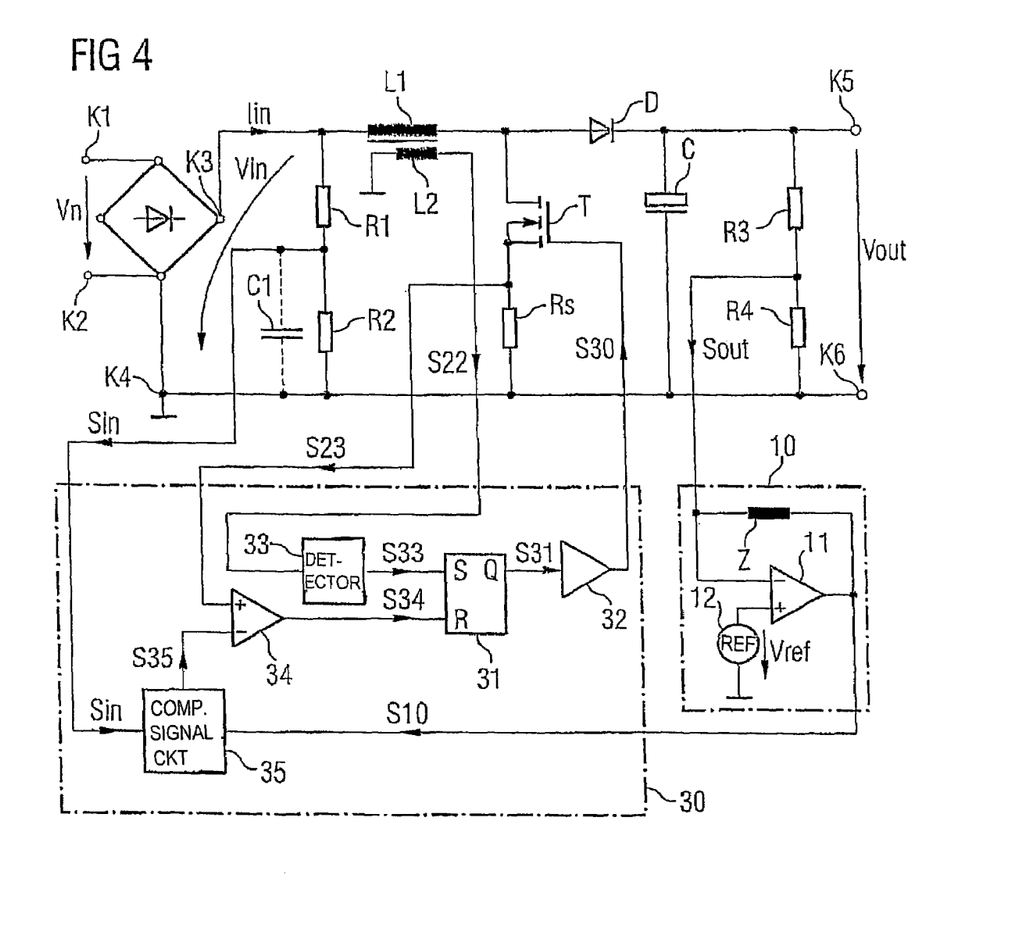
FIG. 4 shows a power factor correction circuit which has a drive circuit for a switch based on a first exemplary embodiment of the invention.
Figure 6:
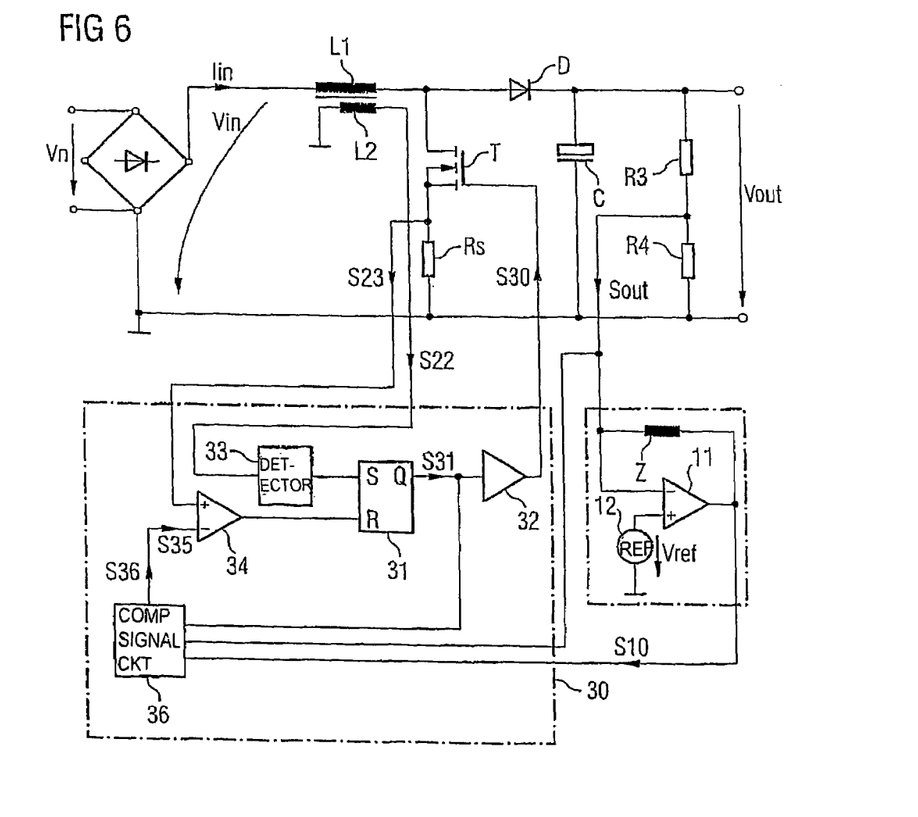
FIG. 6 shows a power factor correction circuit which has a drive circuit for a switch according to a second exemplary embodiment of the invention.
Figure 8:
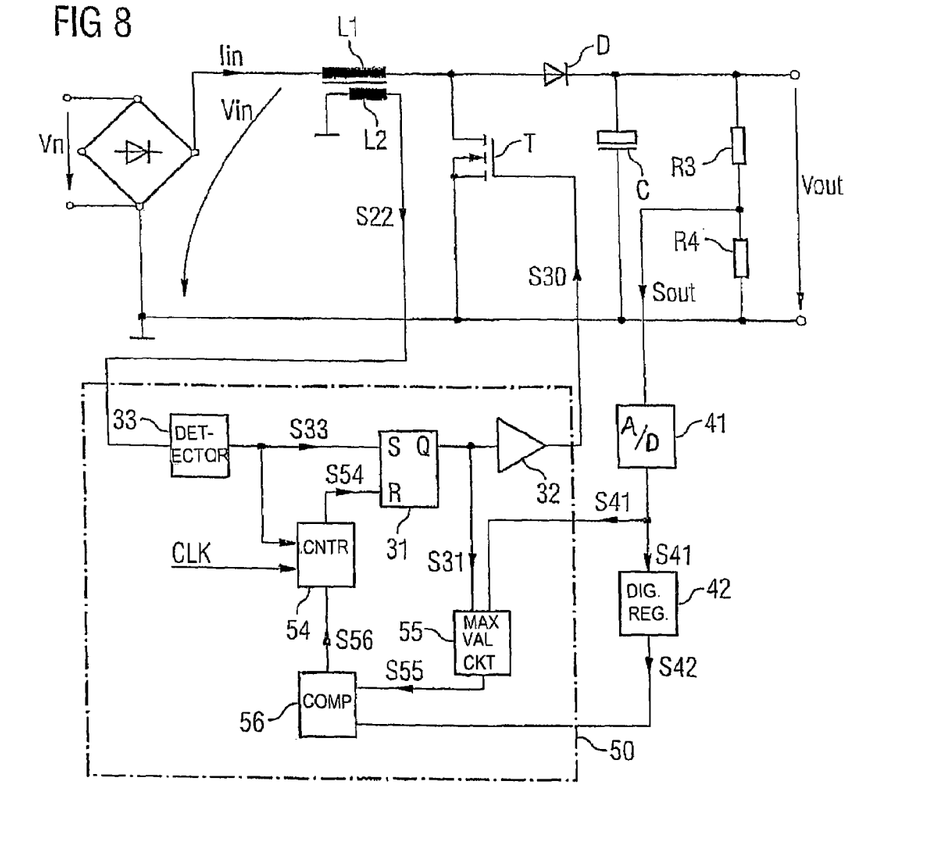
FIG. 8 shows a power factor correction circuit which has a drive circuit for a switch according to a further exemplary embodiment of the invention.

Although the subject matter of the present invention involves a method for driving a switch in a power factor correction circuit and a drive circuit for a switch such as this, FIGS. 4, 6, and 8 illustrate a complete power factor correction circuit, in order to assist understanding. The circuit components which correspond to the known power factor correction circuit shown in FIG. 1 are in this case provided with corresponding reference symbols. Reference shall be made to the description relating to FIG. 1 for the circuitry and method of operation of these circuit components.

FIG. 4 shows a power factor correction circuit with a drive circuit according to the invention, which produces a drive signal S30 for a switch T which controls the power consumption of the power factor correction circuit. In the exemplary embodiment, the switch T is in the form of a power MOSFET, and is connected in series with an inductive energy storage element L1 between input terminals K3, K4, at which a rectified input voltage Vin is available. A rectify arrangement D, C with a diode D and a capacitor C is connected in parallel with the switch T, or, when the switch T is open, in series with the energy storage element L1, with an output voltage Vout that is produced from the rectified input voltage Vin being available across the capacitor C. The power factor correction circuit also has a control arrangement 10 with a control amplifier 11, which compares the output signal Sout (which is derived from the output voltage Vout by means of a voltage divider R3, R4) with a reference value Vref that is produced by a reference voltage source 12, in order to produce a control signal S10. The regulator 10 is, for example, a proportional integral regulator (PI regulator), an integral regulator (I-regulator) or a proportional regulator (P regulator). The regulator 10 comprises a control amplifier 11 which is connected externally to an impedance Z which determines the control response of the control amplifier 11. The impedance Z represents a passive network which may, in particular, comprise capacitors in order to achieve a control arrangement 10 with an integrated control response.

The control signal S10 that is produced by the regulator arrangement 10 is supplied to the drive circuit 30. The drive circuit 30 is also supplied with an input signal Sin (which is dependent on the rectified input voltage Vin and, in the exemplary embodiment, is produced using a voltage divider R1, R2), a magnetization signal S22 and a current measurement signal S23. The magnetization signal S22 in the exemplary embodiment is produced by an auxiliary winding L2, which is inductively coupled to the inductive energy storage element L1 and one of whose connections is connected to a reference ground potential GND, to which the input voltage Vin is also related. Another connection of the auxiliary winding is connected to the drive circuit 30. The current measurement signal S23 is a voltage signal which is likewise related to the reference ground potential GND, corresponds to the voltage across a current measurement resistor Rs (which is connected in series with the switch T) and is proportional to the input current Iin when the switch T is closed.

The drive circuit comprises a logic storage element 31 which, in the exemplary embodiment, is in the form of an RS flipflop, and whose set input S is supplied with a switching-on signal S33, while its reset input R is supplied with a switching-off signal S34. The non-inverting output O of this flipflop 31 is followed by a driver circuit 32 which converts a logic signal S31, which is produced at the output of the flip-flop, to a level that is suitable for driving the power transistor T. The flipflop 31 is set by the switching-on signal S33 in order to produce a switching-on level of the drive signal S30 at the output of the driver circuit 32, and the flipflop is reset as a function of the switching-off signal S34 in order to produce a switching-off level of the drive signal S30 at the output of the driver circuit 32. The transistor T is switched on, or starts to conduct, at a switching-on level of the drive signal S30, and is switched off at a switching-off level of the drive signal S30.

The switching-on signal S33 is produced by a detector circuit 33 which is supplied with the magnetization signal S22 and detects the zero crossings of the magnetization signal S22 in order to set the flipflop 31 via the switching-on signal S33 on detection of such a zero crossing. In this case, a zero crossing of the magnetization signal indicates complete demagnetization of the storage inductor L1.

In order to produce the switching-off signal S34, the current measurement signal S23 is compared by means of a comparator 34 with a comparison signal S35 that is produced by a comparison signal production circuit 35. The flipflop 31 is in this case reset in order to switch off the transistor T in each case when the current measurement signal S23 exceeds the value of the comparison signal S35 while the switch T is switched on.

The comparison signal S35 is produced by the comparison signal production circuit 35 as a function of the control signal S10 and the input signal Sin, which is dependent on the input voltage Vin, and will be explained in more detail in the following text with reference to FIG. 5.

Figure 5:
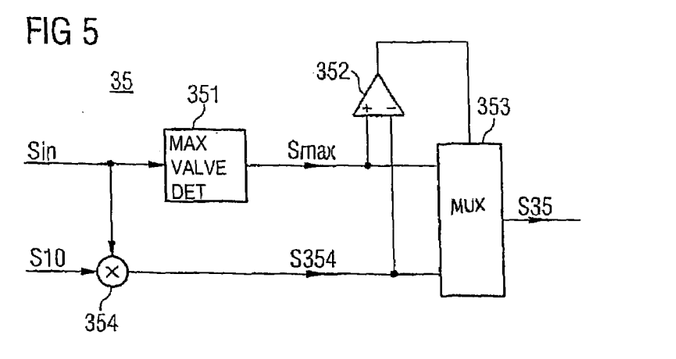
FIG. 5 shows a detailed illustration of a unit in the drive circuit illustrated in FIG. 4.

FIG. 5 schematically illustrates one exemplary embodiment of the comparison signal production circuit 35, to which the input signal Sin and the control signal S10 are supplied. This signal production circuit 35 comprises a multiplier 354, which multiplies the control signal S10 by the input signal Sin in order to produce a first comparison signal S354. The signal production circuit also has a maximum value determination unit 351, which produces a second comparison signal Smax as a function of the input signal Sin, which is dependent on the input voltage Vin. The two comparison signals S354, Smax are supplied to a multiplexer 353, which in each case passes on the lower of the two comparison signals as the comparison signal S35 to its output. The multiplexer is driven by a comparator 352 whose inputs are supplied with the comparison signals Smax, S354, and whose output drives the multiplexer 353.

Figure 9:
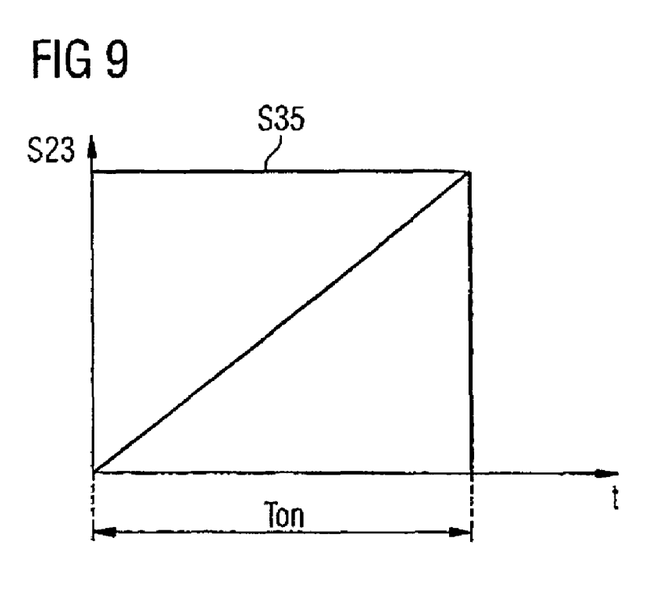
FIG. 9 shows the waveform of a current measurement signal during one switched-on duration.

With reference to FIG. 9, the comparison signal S35 determines the switched-on duration Ton of the power transistor. Once the transistor T has been switched on, the input current Iin, and thus the current measurement signal S23, lies linearly, with the end of the switched-on duration Ton being reached when the current measurement signal S23 has risen to the value of the comparison signal S35. This switched-on duration Ton is given, as a function of the comparison signal S35, of the inductance value L1 of the storage inductor, of the input voltage Vin and of the value of the measurement resistor Rs as:

$$Ton=(S35 \cdot L1)/(Vin \cdot Rs) \quad (9).$$

The object of the second comparison signal Smax is to limit the switched-on duration Ton to a maximum value Tonmax on the basis of equation (7). The maximum value production circuit is for this purpose designed to determine a second comparison value Smax on the basis of the following relationship:

$$Smax=(Tonmax \cdot Vin \cdot Rs)/L1 \quad (10)$$

Substitution of equation (6) or (7) gives:

$$Smax = (klim1/Vin^2) \cdot (Vin \cdot Rs/L1) = \quad (11)$$
$$= (2 \cdot Pmax \cdot L1/Vin^2) \cdot (Vin \cdot Rs/L1) =$$
$$= 2 \cdot Pmax \cdot Rs/Vin$$

If it is remembered that Sin=Vin/k3 then the following relationship becomes valid, on the basis of which the unit 351 produces the second comparison signal Smax from the input signal Sin:

$$Smax=2 \cdot Pmax \cdot Rs \cdot k3/Sin=klim3/Sin \quad (12)$$

Where Pmax denotes the maximum permissible power consumption, which can be predetermined to be fixed. The limit value klim3 takes account of this maximum power consumption and, in the present case, of the proportionality factor between the input current Iin and the current measurement signal S23, as well as the proportionality factor between the input voltage Vin and the input signal. The second comparison signal Smax defines a maximum value for the input current Iin, in which case, as explained, Smax may be defined either on the basis of the maximum permissible switched-on duration Tonmax or the maximum permissible input current.

In this context, it should be noted that this current measurement signal S23 can be produced by means of any desired conventional current measurement arrangement, in particular using a current measurement arrangement which operates on the basis of the so-called "current sense method", and which does not have any current measurement resistor connected in the load circuit.

In the circuit arrangement shown in FIG. 4, the drive circuit 30 is supplied with an input signal Sin, which is dependent on the input voltage Vin, in order to produce the first and second comparison signals S354, Smax.

FIG. 6 shows a modification of the drive circuit illustrated in FIG. 4, in which the comparison signal S35 is produced by means of a comparison signal production circuit 36, which produces this comparison signal S35 from the control signal S10, the output signal Sout, as well as the switched-on duration Ton and the switched-off duration Toff of the drive signal S30. The information about the switched-on duration and the switched-off duration of the drive signal S30 is supplied to the comparison signal production circuit 36 in the exemplary embodiment via the output signal S31 from the flipflop 31.

Figure 7:
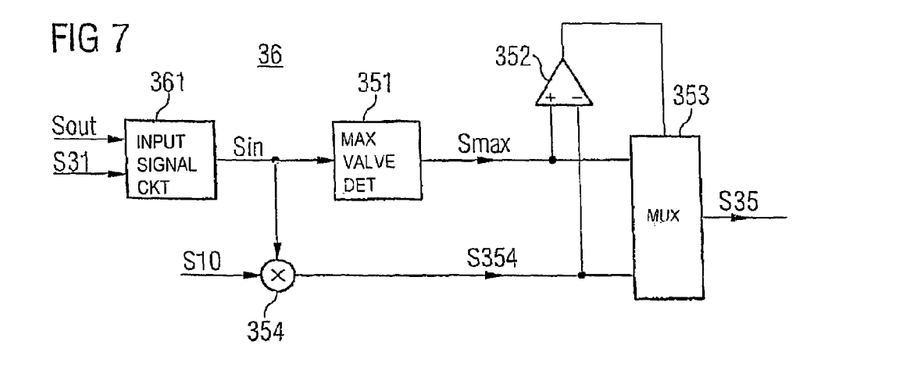
FIG. 7 shows a detailed illustration of a unit in the drive circuit illustrated in FIG. 4.

FIG. 7 shows the design of this comparator circuit 36, which differs from that illustrated in FIG. 5 by having an input signal production circuit which uses the output signal Sout and the flipflop output signal S31 to produce the input signal Sin which is required to produce the first and second comparison signals S354, Smax. This input signal production circuit 361 produces the input signal Sin on the basis of the equation (5), with the input signal Sin being set instead of the input voltage Vin, and the output signal Sout being set instead of the output voltage Vout.

The advantage of the drive circuit 30 shown in FIG. 6 is that there is no need for a voltage divider to derive the input signal Sin from the input voltage Vin.

FIG. 8 shows a power factor correction circuit with a drive circuit according to a further exemplary embodiment of the present invention. In a corresponding manner to the drive circuits that have already been explained, this drive circuit 50 comprises a logic storage element 31 which is in the form of a flipflop and which is followed by a driver circuit 32, at whose output the drive signal S30 for the power transistor T is produced. The drive circuit 50 is also supplied with a magnetization signal S22, which is produced by an auxiliary coil L2 and from which a detector circuit 33 produces a switching-on signal S33, which is supplied to the set input of the flipflop. In contrast to the circuit components in the already explained drive circuits 30, the other circuit components in this drive circuit 50 are in the form of digital circuit components.

A digital counter 54 is used to produce a switching-off signal S54, which is supplied to the reset input R of the flipflop 31, which digital counter 54 has a clock input for supplying a clock signal CLK, a loading input for supplying a switched-on duration value S56, and a drive input for starting the counter. The counter drive input is supplied with the switching-on signal S33, in order to allow the counter either to count up or to count down in time with the clock signal CLK, depending on the embodiment of the counter, when the power transistor T is switched on. Depending on the embodiment of the counter 54, the switching-off signal S54 for resetting the flipflop 31, and thus for switching off the power transistor T, is produced when the counter reaches the switched-on duration value S56 starting from a count of zero, or when the counter has counted down to zero starting from the switched-on duration value 56. The switched-on duration value 56 thus directly represents a measure of the switched-on duration Ton of the power transistor T, with the switched-on duration in this case corresponding to the product of one period duration of the clock signal and the switched-on duration value S56.

The switched-on duration value S56 is obtained from a first or second switched-on duration value by means of a digital comparator 56. The first switched-on duration value S42 in this case represents a regular switched-on duration Ton, and the second digital switched-on duration value S55 represents a maximum switched-on duration Tonmax for the power transistor. This second switched-on duration value S55, which represents the maximum switched-on duration, is produced in a maximum value determination unit 55, which is supplied with the output signal from the flipflop S31 and with a digitized output signal S41.

The digitized output signal S41 is in this case produced by means of an analog/digital converter 41, which is supplied with the output signal Sout produced by the voltage divider R3, R4. The maximum value determination unit 55 is designed to analyze the output signal from the flipflop S31 in order to determine the instantaneous switched-on duration Ton and the instantaneous switched-off duration Toff. For this purpose, the flipflop output signal is, for example, sampled in time with a clock signal and is compared with a reference value which, for example, is between the two output levels of the flipflop. The number of successive sample values above the reference value are in this case counted in order to determine the switched-on duration Ton or a value which is directly related to the switched-on duration. The number of successive sample values below the reference value are counted in a corresponding manner in order to determine the switched-off duration Toff or a value which is directly related to the switched-off duration.

The maximum value determination unit 55 uses the switched-on duration Ton and the switched-off duration Toff as well as the digital output signal S41 to determine the second switched-on duration value S55, which represents the maximum switched-on duration, on the basis of the equation (7), using the equation (5) to determine the input voltage Vin from the digitized output signal S41.

The first digital switched-on duration value S42, which defines a regular switched-on duration for the switch T, is determined from the digital output signal S41 by means of a digital regulator 42. This regulator 42 is designed in particular to compare the digitized output signal S41 with a reference value, in order to produce a digital control signal from the difference between the reference value and the digital output signal S41, in a manner which will not be described in any more detail, in which case, for example using a look-up table, each digital control signal that is produced in this way is assigned a digital signal S42 which represents the switched-on duration. With this arrangement, there is no need to use a current measurement signal to produce a signal that defines the switched-on duration of the switch T.

LIST OF REFERENCE SYMBOLS

| | |
|---|---|
| 10 | Regulator |
| 11 | Control amplifier, operational amplifier |
| 12 | Reference voltage source |
| 20 | Drive circuit |
| 30 | Drive circuit |
| 31 | Logic storage element, RS-flipflop |
| 32 | Driver circuit |
| 33 | Detector arrangement |
| 34 | Comparator |
| 35 | Comparison signal production circuit |
| 36 | Comparison signal production circuit |
| 41 | Analog/digital converter |
| 42 | Digital regulator |
| 54 | Digital counter |
| 55 | Maximum value production circuit |
| 56 | Digital comparator |
| C | Capacitor |
| C1 | Capacitor |
| D | Diode |
| Iin | Input current |
| K1, K2 | Power supply connecting terminals |
| K3, K4 | Input terminals |
| K5, K6 | Output terminals |
| L1 | Inductive storage element, storage inductor |
| L2 | Auxiliary winding |
| M | Multiplier |
| R1, R2 | Voltage divider |
| R3, R4 | Voltage divider |
| Rs | Current measurement resistor |
| S10 | Control signal |
| S21 | Comparison signal |

| | |
|---|---|
| S22 | Magnetization signal |
| S23 | Current measurement signal |
| S30 | Drive signal |
| S31 | Flipflop output signal |
| S33 | Switching-on signal |
| S34 | Switching-off signal |
| S35 | Comparison signal |
| S36 | Comparison signal |
| S41 | Digitized output signal |
| S42 | First digital comparison signal |
| S55 | Second digital comparison signal |
| Sin | Input signal |
| T | Switch, power transistor |
| Vin | Input voltage |
| Vn | Power supply voltage |
| Vout | Output voltage |
| Vref | Reference voltage |
| Z | Impedance |

The invention claimed is:

1. A method of providing a drive signal for a switch which controls the current drawn by an inductive energy storage element in a power factor correction circuit, wherein the power factor correction circuit includes a rectifier arrangement coupled to the inductive energy storage element and defining an input voltage therebetween, the power factor correction circuit further including output terminals for provision of an output voltage, and wherein a control signal is provided in the power factor correction circuit, the control signal operable to control power consumption in the power factor correction circuit, for one drive cycle of the switch the method comprising:
   a) detecting a predetermined storage state of the inductive energy storage element;
   b) producing a switching-on level for the drive signal when the predetermined storage state of the storage element is detected, wherein the switching-on level for the drive signal is produced (i) for a regular switched-on duration which is dependent on the control signal or (ii) for a maximum switched-on duration which is dependent on an input voltage, when the regular switched-on duration is greater than the maximum switched-on duration;
   c) producing a switching-off level for the drive signal for a switched-off duration until a subsequent detection of the predetermined storage state of the inductive energy storage element; and
   d) determining the input voltage from the switched-on duration, the switched-off duration, and the output voltage or a signal dependent upon the output voltage.

2. The method of claim 1 wherein the step of producing a switching-on level for the drive signal for a maximum switched-on duration which is dependent on the input voltage, when the regular switched-on duration is greater than the maximum switched-on duration, is operable to limit power consumption.

3. The method of claim 1 wherein a peak current value, Imax, is determined using the following relationship:

$$\text{Imax} = \text{klim2}/\text{Vin}$$

where Imax represents the peak current, Vin represents the input voltage, and klim2 represents a predetermined limit value which takes account of a maximum power consumption.

4. The method of claim 1 wherein the maximum switched-on duration is determined using the following relationship:

$$\text{Tonmax} = \text{klim1}/\text{Vin}^2$$

where Tonmax represents the maximum switched-on duration, Vin represents the input voltage, and klim1 represents a predetermined limit value which takes account of a maximum power consumption.

5. The method of claim 1 wherein the maximum relative switched-on duration, donmax, is determined using the following relationship:

$$\text{donmax} = \text{klim1}/(\text{Vin}^2 \cdot \text{T})$$

where donmax represents the maximum relative switched-on duration, Vin represents the input voltage, T represents the period duration and klim1 represents a predetermined limit value which takes account of a maximum power consumption.

6. The method of claim 1 wherein the predetermined storage state of the inductive energy storage element is a first complete demagnetization after the switched-on duration has elapsed.

7. A method of providing a drive signal for a switch which controls the current drawn by an inductive energy storage element in a power factor correction circuit, wherein the power factor correction circuit includes a rectifier arrangement coupled to the inductive energy storage element and includes output terminals for provision of an output voltage, and wherein a control signal is provided in the power factor correction circuit, the control signal operable to control power consumption in the power factor correction circuit, for one drive cycle of the switch the method comprising:
   a) detecting a predetermined storage state of the inductive energy storage element;
   b) providing a current measurement signal which is dependent on an input current to the inductive energy storage element;
   c) producing a switching-on level for the drive signal when the predetermined storage state of the storage element is detected, wherein the switching-on level for the drive signal is produced (i) for a regular switched-on duration which is dependent on the control signal or (ii) until a peak value which is dependent on an input voltage of the input current is reached, if the peak value is reached within the regular switched-on duration; and
   d) producing a switching-off level for the drive signal for a switched-off duration until a subsequent detection of the predetermined storage state of the inductive energy storage element.

8. The method of claim 7 wherein a peak current value, Imax, is determined using the following relationship:

$$\text{Imax} = \text{klim2}/\text{Vin}$$

where Imax represents the peak current, Vin represents the input voltage, and klim2 represents a predetermined limit value which takes account of a maximum power consumption.

9. The method of claim 7 wherein the input voltage, Vin, is determined using the following relationship:

$$\text{Vin} = \text{Toff} \cdot \text{Vout}/(\text{Ton} + \text{Toff})$$

where Vin represents the input voltage, Ton represents the switched-on duration of the drive signal, Toff represents the switched-off duration of the drive signal, and Vout represents the output voltage.

10. The method of claim 9 wherein a maximum switched-on duration is determined using the following relationship:

$$\text{Tonmax} = \text{klim1}/\text{Vin}^2$$

where Tonmax represents the maximum switched-on duration, Vin represents the input voltage, and klim1 represents a predetermined limit value which takes account of a maximum power consumption.

11. The method of claim 9 wherein a maximum relative switched-on duration, donmax, is determined using the following relationship:

$$donmax = klim1/(Vin.^2 \cdot T)$$

where donmax represents the maximum relative switched-on duration, Vin represents the input voltage, T represents the period duration and klim1 represents a predetermined limit value which takes account of a maximum power consumption.

12. The method of claim 7 wherein the input voltage, Vin, is determined using the following relationship:

$$Vin = Vout(1d)$$

where Vin represents the input voltage, Vout represents the output voltage, and d represents a relative switched on duration of the drive signal.

13. The method of claim 12 wherein a maximum switched-on duration is determined using the following relationship:

$$Tonmax = klim1/Vin^2$$

where Tonmax represents the maximum switched-on duration, Vin represents the input voltage, and klim1 represents a predetermined limit value which takes account of a maximum power consumption.

14. The method of claim 12 wherein a maximum relative switched-on duration, donmax, is determined using the following relationship:

$$donmax = klim1/(Vin^2 \cdot T)$$

where donmax represents the maximum relative switched-on duration, Vin represents the input voltage, T represents the period duration and klim1 represents a predetermined limit value which takes account of a maximum power consumption.

15. The method of claim 7 wherein the predetermined storage state of the inductive energy storage element is a first complete demagnetization after the switched-on duration has elapsed.

16. A drive circuit for production of a drive signal for a switch which controls the current drawn in a power factor correction circuit, the power factor correction circuit including a rectifier arrangement coupled to an inductive energy storage element with an input voltage defined between the rectifier arrangement and the inductive energy storage element, the drive circuit comprising:
   a) a first input configured to receive a control signal which is operable to regulate the power consumption, and a second input configured to receive a magnetization signal which indicates a storage state of the inductive energy storage element;
   b) an output configured to provide the drive signal;
   c) a logic storage element operable to switch to a first storage state as a function of the magnetization signal in order to produce a switching-on level for the drive signal, the logic storage element further operable to switch to a second storage state as a function of a switching-off signal in order to produce a switching-off level for the drive signal;
   d) a signal production circuit operable to produce the switching-off signal as a function of the control signal and the input voltage, wherein the signal production circuit is designed to produce the switching-off signal at the latest after a maximum switched-on duration or upon reaching a maximum input current, with the signal production circuit determining the maximum switched-on duration or the maximum input current from the input voltage or from a signal derived from it.

17. The drive circuit of claim 16, wherein the signal production circuit is operable to determine the input voltage from the drive signal or from a signal which is dependent on the drive signal and from the output voltage.

18. The drive circuit of claim 16 wherein the signal production circuit is operable to determine the input voltage, Vin, using the following relationship:

$$Vin = Toff \cdot Vout/(Ton + Toff)$$

where Vin represents the input voltage, Ton represents the switched-on duration of the drive signal, Toff represents the switched-off duration of the drive signal, and Vout represents the output voltage.

19. The drive circuit of claim 16 wherein the signal production circuit is operable to determine the input voltage, Vin, using the following relationship:

$$Vin = Vout \cdot (1-d)$$

where Vin represents the input voltage, Vout represents the output voltage, and d represents a relative switched on duration of the drive signal.

* * * * *